United States Patent [19]
Hoss, Sr. et al.

[11] 3,771,820
[45] Nov. 13, 1973

[54] ADHESIVE BONDED SPLIT SLEEVE COUPLING FOR PIPES AND TUBULAR MEMBERS

[75] Inventors: Warren A. Hoss, Sr.; Robert H. Kilpatrick, both of Marietta, Ga.

[73] Assignee: Lockheed Aircraft Corporation, Burbank, Calif.

[22] Filed: May 22, 1972

[21] Appl. No.: 255,678

[52] U.S. Cl............ 285/373, 285/423, 285/DIG. 16
[51] Int. Cl............................................ F16l 13/10
[58] Field of Search.................... 285/372, 373, 419, 285/DIG. 16, 337, 423, 292, 284, 294, 197; 138/99, 151, 156, 170, 171; 24/23 W; 287/111, 52.03, 110

[56] References Cited
UNITED STATES PATENTS

| | | | |
|---|---|---|---|
| 3,229,998 | 1/1966 | Pennington | 138/99 |
| 1,928,570 | 9/1933 | Mustico | 138/99 |
| 3,124,874 | 3/1964 | Wooley | 285/DIG. 16 |
| 924,262 | 6/1909 | Moll | 138/99 |
| 2,173,399 | 9/1939 | Mills | 285/373 |
| 2,898,945 | 8/1959 | Backer | 285/373 |
| 710,721 | 10/1902 | Sindelar | 285/373 |

FOREIGN PATENTS OR APPLICATIONS

| 1,449,044 | 7/1966 | France | 285/419 |
|---|---|---|---|

Primary Examiner—Jordan Franklin
Assistant Examiner—Conrad L. Berman
Attorney—Albert L. Carter et al.

[57] ABSTRACT

A split, sleeve-like structure of identical cross-sectional elements, which when secured to a pipe or tubular member joint by a curable adhesive provides a permanent joint of strength greater than the joined pipe or tubular members, the joint being leak-proof with a connector or coupling at as little as 20 percent of the weight of mechanical pipe or tube connectors.

Overlapping portions of adjacent sleeve elements include flat confronting surfaces to permit sliding in a linear relationship relative to each other as they are moved radially relative to the members being joined whereby an increase in the joint bond line is attained, as well as manufacturing tolerance variations in the outer diameter of the members being jointed becomes substantially immaterial to the completed joint strength. Placement of the sleeve elements over a leak or hole in the wall of a pipe or conduit, or other damaged portion thereof, permits repair of the leak or damaged portion without cutting of the pipe or conduit.

This sleeve coupling permits joining of any metal or composite (e.g., carbon fiber, boron fiber, glass fiber, etc.) pipe or tubular members, as well as the joining of dissimilar materials, and whether the jointed members are of the same or different size diameters.

9 Claims, 13 Drawing Figures

ADHESIVE BONDED SPLIT SLEEVE COUPLING FOR PIPES AND TUBULAR MEMBERS

This invention relates generally to a split sleeve type, permanent coupling for hydraulic lines and/or tubular members, and more specifically to a coupling which is adhesive bonded to the pipe or tube members as well as interconnection of the coupling members by adhesive bonding for the joining of pipe or tubular members, the repair of leaks therein, or the structural increase thereof in the case of scratched or dented hydraulic lines.

In the case of hydraulic pipes or ducts containing a pressurized fluid flow, the prior art has known a variety of mechanical and/or threaded type connections or couplings wherein components are interconnected by swaging and/or interconnected by threaded fitting members, all of which are susceptible of leaking, require substantial bulk, and consequently, in the case of aircraft, a penalty due to the weight and/or volume of the fitting.

Also, the prior art has known what can be called generically a split sleeve coupling of the same general nature as this invention, but as exemplified by the most pertinent of prior art of this type as shown by United States Letters Pat. No. 3,229,998, there are encountered volume and weight penalties, reduced joint strength, and lack of infinite adjustments, all as provided for in this invention.

Likewise, for the joining of tubular structural elements, there is provided in one embodiment of this invention an arrangement whereby structure loads are so located as to avoid load concentration notches at the weakest part of the assembled structure by relocation of the structure loads to a stronger part of the installed joint.

Accordingly, it is an object of this invention to provide a joint capable of attaining a joint strength that is equal to at least the stength of the joined material.

A further object of this invention is to provide a reduction of alignment and sizing problems inherent in a joint design.

A still further object of this invention is to provide a structural joint arrangement that accomplishes a natural corrosion barrier between dissimilar materials being joined.

Another object of this invention is to provide a structural joint arrangement that is compatible between joined metallic-composite elements.

Yet another object of this invention is to provide for a major reduction in installed joint weight, whereby very significant savings for total weight is accomplished as most desirable in aircraft hydraulic and structural systems applications.

A still further object of this invention is to provide a structural joint arrangement which is easily producible, fatigue resistant, and reduces joint weight approximately 75 percent over the mechanical type joints it replaces.

Another object of this invention is to provide a structural joint arrangement that is of reduced cost for both the coupling as well as the installment costs, yet is capable of universally functioning as a structural joint coupling, repair of a leaking hydraulic line, and reinforcing weakened hydraulic lines as occasioned by scratches and/or dents; such functions other than serving as a coupling being accomplished without the necessity of cutting the tube of lines.

Other objects and advantages will become apparent from the following description taken in connection with the accompanying drawings in which.

Figure 3:
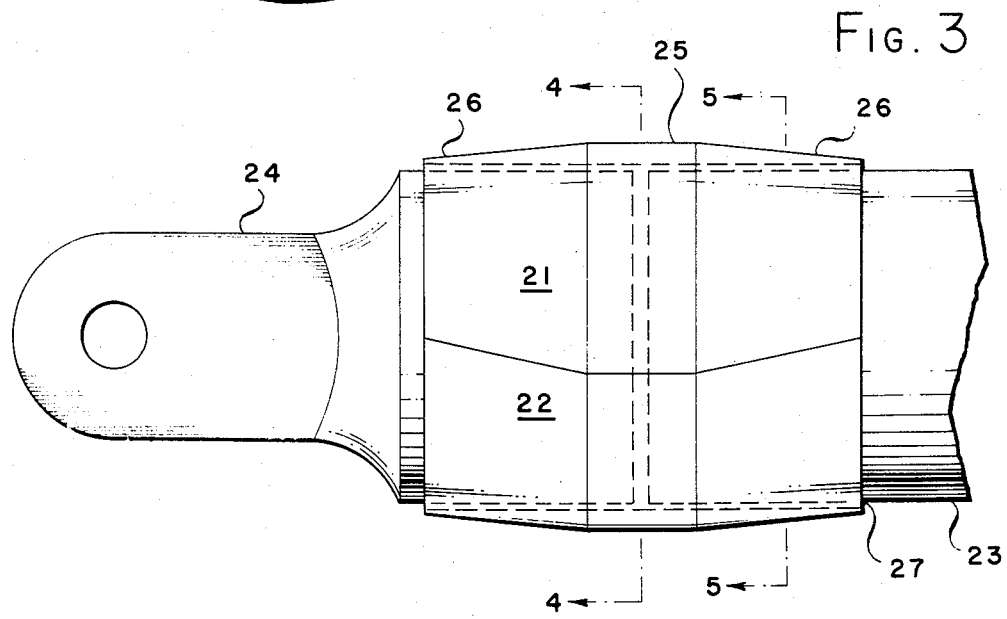
FIG. 3 is a view similar to FIG. 1, but showing another embodiment of this invention.
Figure 4:
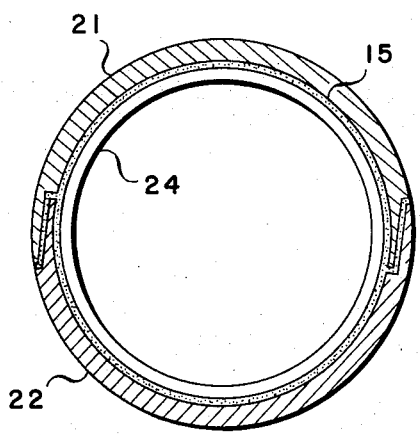
Figure 5:
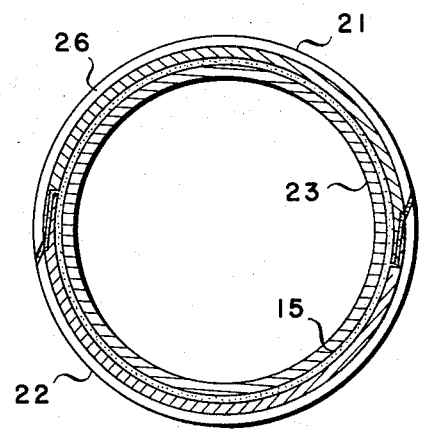
Figure 6:
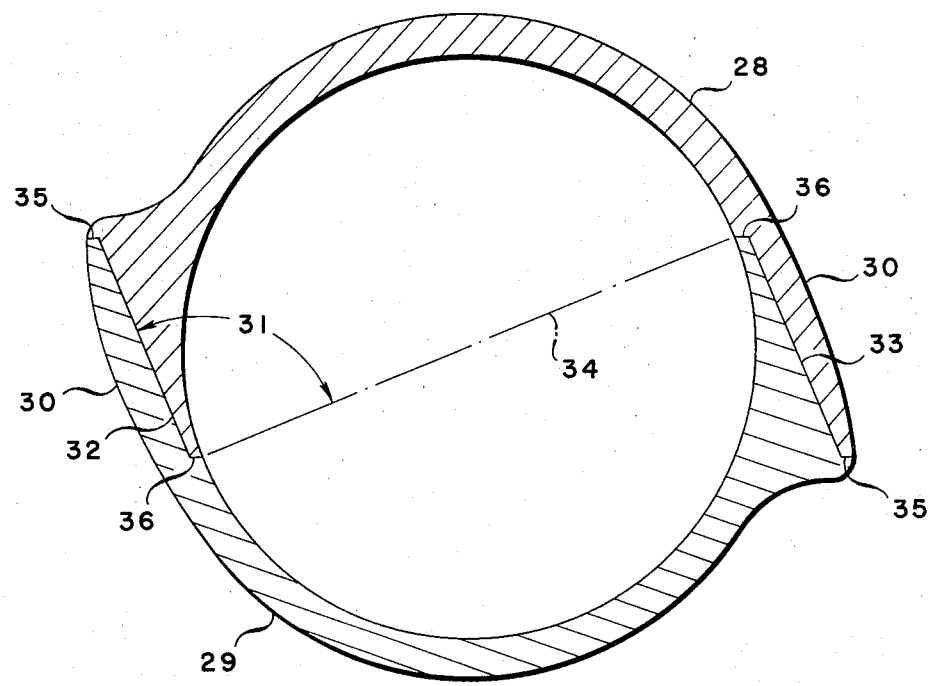
Figure 7:
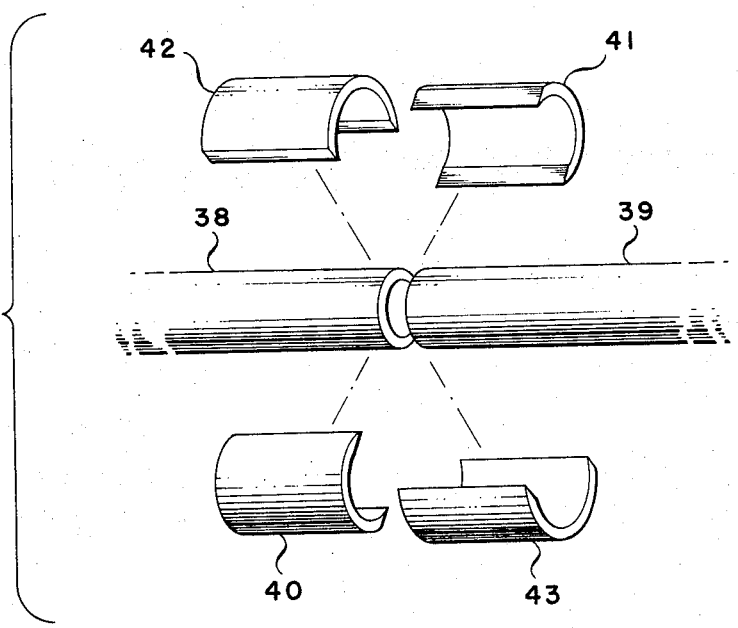
Figure 8:
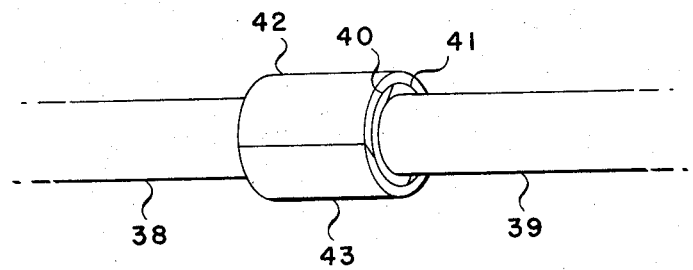
Figure 9:
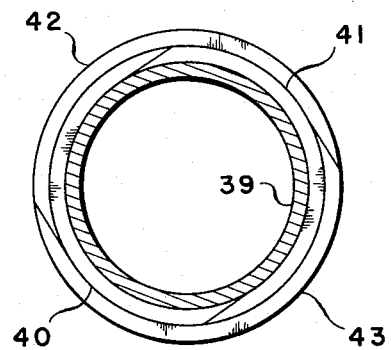
Figure 10:
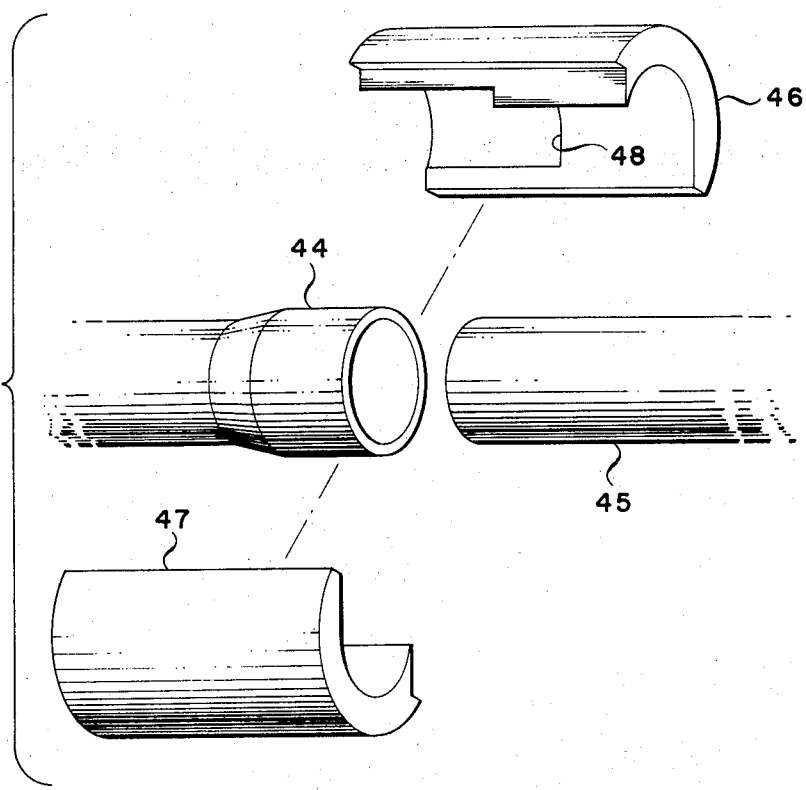
Figure 11:
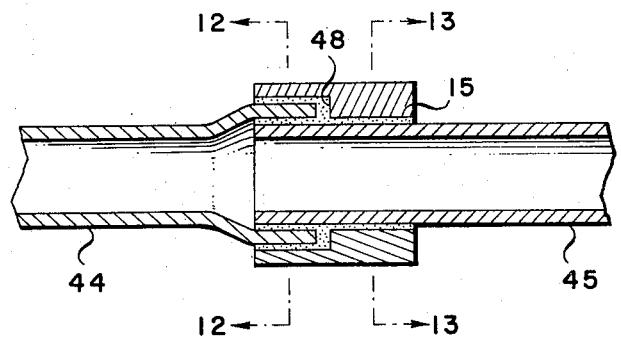

FIGS. 4 and 5 are cross-sectional views of the joint of FIG. 3 taken along lines 4—4 and 5—5 of FIG. 3 respectively;

FIG. 6 is an enlarged cross-sectional view of another embodiment of coupling elements showing in greater detail some of the interrelationship between the coupling members of this invention;

FIG. 7 is an exploded perspective view of another embodiment of this invention involving a coupling for high pressure hydraulic lines wherein a double split sleeve assembly is utilized;

FIG. 8 shows the assembled relationship of all of the components of the joint of FIG. 7;

FIG. 9 is a cross-sectional view of the installed joint embodiment depicted in FIGS. 7 and 8;

FIG. 10 is an exploded perspective view of another embodiment of this invention involving a joint whereby one of the pipe members is provided with a bell mouth at the joint end, as well as depicting a coupling for joining dissimilar size pipe or tubular members;

FIG. 11 is a longitudinal cross-sectional view of the joint of FIG. 10; and

Figure 12:
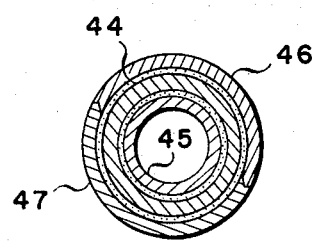
Figure 13:
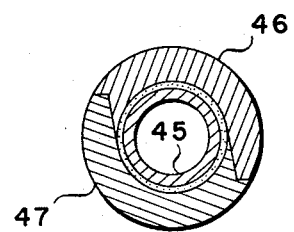

FIGS. 12 and 13 are cross-sectional views taken along lines 12—12 and 13—13, respectively, of FIG. 11.

Generally stated, this invention consists of split sleeve members located around the pipe or tube ends to form a joint, with the split sleeve members being adhesively bonded to the pipe or tube members and to each other by a thermo or ambient curable adhesive material. The adjoining edge portions of the split sleeve members are so configured that there is an overlap therebetween, with this overlap in turn containing adhesive bonding material whereby the bond line area of the joint is increased so that the bond joint strength, in turn, is increased.

One application of the coupling of this invention serves to create a permanent joint for tubing that serves as conduits such as hydraulic systems, fuel systems, pitot tubes, and other instrumentation, etc., where internal pressures, leakage, termperature and pressure cycling, and environmental considerations are paramount. A second area of application involves joining of structural elements, but would not necessarily be limited to tubing by including the attachment of end fittings, joining of dissimilar materials (such as composites, rods, and mechanically fastened plates), and the formation of structural elements such as struts; all involving installations where tensile, torsional and fatigue properties would be the major consideration and the joint design and qualification testing therefor would be different from fluid line joints even though one principle of the joint is similar.

Figure 1:
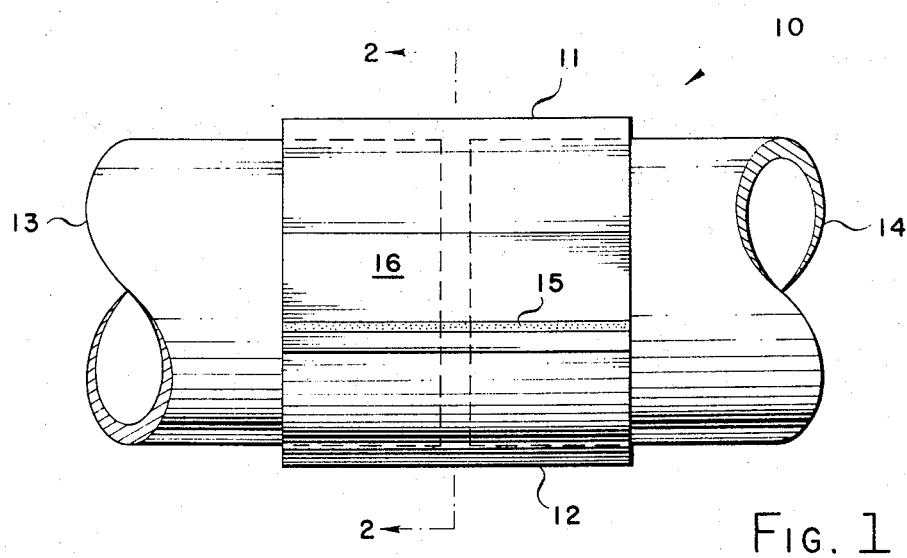
FIG. 1 is a side view of an installed coupling of one embodiment of this invention.
Figure 2:
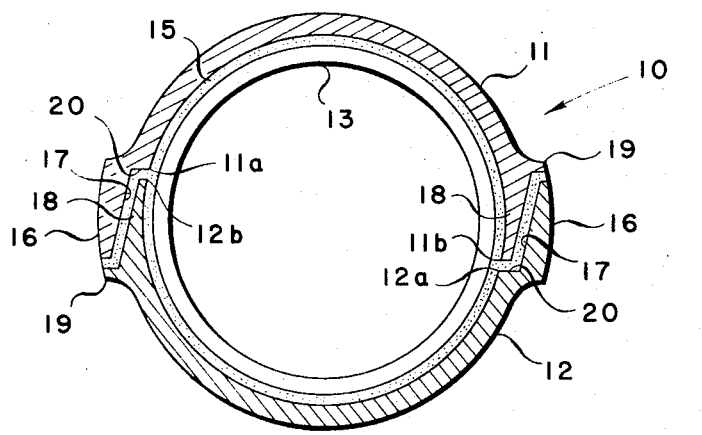
FIG. 2 is a cross-sectional view of the embodiment of FIG. 1 taken along line 2—2 of FIG. 1.

Referring to FIGS. 1 and 2, the joint 10 comprises a pair of sleeve segments 11 and 12 which overlap or abridge the seam or gap joint of aligned pipe members 13 and 14, with the sleeve segments 11 and 12 bonded to pipe members 13 and 14 as well as to each other by adhesive 15.

The sleeve segments 11 and 12 are preferably of a metallic material, and are so shaped so as to extend circumferentially around the pipe or tubular members being joined as can best be seen in FIG. 2. As can also be seen in FIG. 2, sleeve segments 11 and 12 are of identical cross-sectioned shaped, but arranged 180° longitudinally relative to each other. The internal arcuate diameter of sleeve segments 11 and 12 is configured to be no less than the external diameter of the members being joined, and has been found to be most optimally 0.001 to as much as 0.015 inch diameter greater than the members being joined.

While the individual overall arcuate length of each sleeve segment 11 and 12 is greater than 180°, the amount of confronting interior surface of each of the segements relative to pipe 13 seen in FIG. 2 does not exceed 180°; or, in other words, the arcuate or circumferential distance between points 11a and 11b or 12a and 12b does not exceed 180° of pipe member 13.

The additional arcuate length of sleeve segments 11 and 12 in excess of the 180° of confrontation of pipe 13 consists of a projection 16 having a substantially flat surface 17 on the inner side thereof. The angle between surface 17 of sleeve segment 11 and a diametric line connecting points 11a and 11b is greater than 90° and less that 180°, the precise angle dependent upon the amount of joint bond area desired as explained in more detail hereinafter.

The edge 18 of sleeve segments 11 and 12 opposite the projection 16 consists of an inner surface that constitutes a portion of the inner arcuate surface of sleeve segments 11 and 12 confronting with the outer surface of pipe members 13 and 14. The outer surface of edge 18 is substantially flat and in confrontation with surface 17 of projection 16 of the other sleeve segment. Outer surfaces of edges 18 and surfaces 17 of projection 16 of both sleeve segments 11 and 12 when installed are all substantially parallel so that the same angular relationship of the outer surfaces of edge 18 and surfaces 17 are substantially in the same relationship to diametric lines between points 11a and 11b and 12a and 12b as is explained hereinbefore.

In the embodiment of FIG. 2 there is shown intermediate the edge portion 18 and the main body portions of sleeve segments 11 and 12 a longitudinally extending shoulder or tab 19 which serves to provide an abutting engagement with the tip ends of projections 16, as well as there is a longitudinally extending relief shelf 20 that serves as an abutting engagement with the tip ends of edges 18 when the clamp is installed as shown in FIG. 2. The primary purpose of shoulders or tabs 19 and relief shelves 20 is to provide a positive stop during installation of the sleeve to prevent an undersizing of the inner diameter of assembled sleeve segments 11 and 12 relative to the other diameter of pipe members 13 and 14 so as to provide at least some minimal thickness of adhesive 15 in the assembled joint. It should be further recognized that such circumferentially abutting engagement between sleeve segments 11 and 12 can be accomplished with only one such engagement, namely, an abutment between the tip end of edge 18 and relief 20, or the abutment between shoulder 19 and the tip end of projection 16. While the width or thickness of the abutting engagement is not deemed overly critical, it is believed that some such engagement is preferable, as well as it is believed such engagement should be on the order of 0.005 inch or greater.

As can be noted in FIG. 2, adhesive 15 is not only located between the inner surfaces of sleeve segments 11 and 12 and the outer surfaces of pipe members 13 and 14, but also between the abutting engagements of the tip ends of edges 18 and relief shelves 20, and the tip ends of projections 16 and shoulders 19, as well as between the outer surfaces of edges 18 and surfaces 17 of projections 16; this location of adhesive 15 throughout the entire joint surfaces increasing the total bond line area of the installed coupling so as to increase the effective strength of the joint. It can further be seen that with this arrangement, installation of the coupling with the overlapping surfaces of the sleeve members 11 and 12 accomplishes a self-sizing joint of infinite adjustments whereby tolerance variations of the inner diameter of sleeve segments 11 and 12 and the outer diameters of pipe members 13 and 14 are substantially of no consequence.

Likewise, it should be pointed out at this time that by reason of the angular relationships of the overlapping surfaces to the effective inner diameters of sleeve segments 11 and 12 a complete elimination of adhesive 15 from the overlap confronting surfaces by a wiping action is precluded, as well as the recognition that variation of such angular relationship of the overlapping surfaces relative to the effective inner diameter of the coupling segments can increase or decrease the bond line area as desired.

Adhesive 15 is any appropriate thermo or ambient curable adhesive material as are known in the prior art available in heavy liquid or paste forms, as well as in sheet forms as exemplified by epoxy resin, polyamide, polyester, acetate, etc., based materials and metallic solders. Specific examples of thermo curable adhesives are PA-3419 available from the 3M Company in St. Paul, Minnesota, and FM 34 available from the Bloomingdale Division of American Cyanimid in Havre de Grace, Maryland. Specific examples of ambient curable adhesives are EA 9309 available from the Hysol Division of Dexter Corporation in Olean, New York and Eastman 910 available from the Eastman Chemical Products, Inc., Division of Eastman Kodak Company in Kingsport, Tennessee.

Once the sleeve members 11 and 12 are placed in the positions shown in FIGS. 1 and 2 around the ends of pipe members 13 and 14, with the adhesive 15 in place, any appropriate holding clamp mechanism is placed on sleeve segments 11 and 12 so as to merely restrain them in place until the adhesive 15 is cured. In the case of adhesive 15 being a thermo-setting type, such clamp may be of a type that will supply heat to the joint for the curing of adhesive 15, which in the case of utilizing the 3M adhesive PA-3419 involves an approximate 350° F temperature for approximately 1 hour duration, it being noted that the specific time and temperature for curing of adhesive 15 depending upon which adhesive material is utilized.

Some evaluation tests were conducted on the coupling of this invention by preparing six specimens of one inch diameter aluminum tubing having a 0.049 inch wall thickness, and compared to six specimens utilizing conventional mechanical fittings of MS sleeves, nut and unions. Burst test results on the split sleeve bonded couplings of this invention showed that tube bursting occurred from a low of 4,600 to a high of 5,350 psi without failure of the coupling, while the conventional or mechanical fitting specimens suffered leakage through the MS sleeves at a low of 2,900 to a high of 4,000 psi at time of failure.

Additional evaluation testing involved the preparation of 16 one-half inch diameter, 0.028 inch wall thickness specimens utilizing the coupling of this invention for environmental, fatigue and burst tests, with the tube joints pressurized with Skydrol at 1,500 psi for one month. The temperature of eight of the specimens was maintained at 160° F during this span while the remainder were maintained at −65° F. The burt test results of these specimens showed that the specimens maintained at 1,500 psi at −65° F failed by tube bursting at pressures of 5,400 psi, while the specimens maintained at 1,500 psi at 160° F also failed by tube bursting at pressures of 5,400 psi, with one specimen failing at 5,700 psi.

Since no established specification exists for fatigue testing of a bonded joint, a level of 15 ksi was arbitrarily chosen for the first fatigue specimen. The tube failed outside the bonded joint after 637,000 cycles. The stress level was reduced to 10 ksi total stress for the second specimen which successfully passed ten million cycles without joint failure. Because of the length of specimen required and limits of the environmental chamber, specimens which were fatigue tested were not subjected to environmental exposure prior to testing.

Additionally a specimen with a split sleeve joint was flexure tested at a stress level of 15,000 psi and failure occurred in the tube after 1,600,000 cycles with no fatigue failure occurring in the bonded joint.

Attempts to determine the ultimate joint strength of the bonded split sleeve coupling involved 1 inch diameter specimens fabricated with AM 350 steel tubing. Burst pressures of the tubing were consistent in the 10,000 psi range while split sleeves bonded to three-eighths inch diameter steel tubing withstood the burst limits of the tube at 19,000 and 21,000 psi.

Finally, tensile tests of specimens of one inch diameter, 0.049 inch wall thickness aluminum tubing joined by bonded split sleeves and mechanical unions were conducted. Three split sleeve specimens suffered failure of the tube at ultimate forces of 6,650, 6,600, and 6,540 pounds, while three specimens utilizing the mechanical union suffered joint failures at ultimate forces of 4,000, 3,650, and 3,640 pounds respectively.

Referring now to FIGS. 3, 4, and 5, there is shown another embodiment of this invention involving a structural application whereby an adhesive bonded split sleeve comprising segments 21 and 22 constitutes an adhesive bonded joint for structural tubular member 23 and an end fitting 24. In this embodiment, sleeve segments 21 and 22 are configured so as to provide a constant diameter intermediate portion 25 from which the outer diameter tapers reducingly in a longitudinal or axial direction to the ends of the coupling as indicated at 26. In this manner the utilization of this embodiment of coupling in an application for carrying structural loads permits concentration of the structure loads at the intermediate portion 25 so as to avoid formation of a load concentration notch effect at the junction 27 of the structural tubular member 23 and sleeve segments 21 and 22 which would occur if the sleeves 21 and 22 had a constant outer diameter throughout their full axial length.

An appropriate adhesive 15 is utilized in the same manner as described for accomplishment of a completed and installed joint.

Also, it is to be understood that this same type of joint may be utilized should another structural tubular member similar to 23 be used in lieu of end fitting 24, as well as the same type of joint embodiment may be utilized for repair of a leak or hole in hydraulic lines or hydraulic lines damaged by such things as a scratch or a dent.

Comparison of FIGS. 4 and 5 show that with the tapered outer diameter surfaces of sleeves 21 and 22, a reduction in the total joint bond line area occurs through a decrease in the amount of arcuate overlap between sleeves 21 and 22 in the tapering portions 26. Evaluation testing of the embodiment utilizing 2 ¼ inch diameter, 0.060 wall thickness alluminum alloy tube ends with a tensile load applied resulted in tube failure in excess of 34,000 pounds without failure of the sleeve joint. Also, aircraft push-pull rods fabricated from aluminum tubes with end fittings attached by blind fasteners resulted in tensile tests failure of the joint at 28,000 pounds of pull, while a similar specimen with the tube and end fitting joined by an adhesive bonded split sleeve coupling of this invention resulted in the failure of the end fitting at 32,000 pounds tensile pull without damage to the coupling joint.

Likewise a 2 ¼ inch diameter composite tube of 10 ply boron joined to metallic tubes and end fittings by an adhesive bonded split sleeve coupling of this invention resulted in no failure or damage to the split sleeve joint on fatigue and tensile testing.

FIG. 6 shows another embodiment of the split sleeve segments of FIGS. 1 and 2 wherein there is provided a single shoulder along each longitudinal extending seam between the segments. In this embodiment, the overlapping end projection 30 of sleeve segments 28 and 29 are smoothly rounded or contoured as compared to the overlapping end projections 16 of FIG. 2. As previously discussed, the angle 31 between the confronting bond line surfaces 32 and 33 with the diametric line 34 serving to define the maximum of 180° of inner diameter of sleeve segments 28 and 29 is such that angle 31 must be greater than 90°, yet less than 180°, with the effective variations in angle 31 between the critical range serving to vary the effective bond line area of the installed joint. Likewise, it is to be recognized that whether there is one or two stop or interference type of confrontations such as 35 and 36 in FIG. 6 is not critical so long as there is one such relative confronting surface relationship. However, it is to be recognized that when two such arrangements as shown at 35 and 36 in FIG. 6 are utilized, there is once again a slight increase in the bond line area of the installed joint.

Also, while not deemed limiting or critical to this invention, it is submitted as most preferable that the inner edge portions of sleeve segments 28 and 29 constituting the surface of confrontation 36 not extend beyond the point of its tangency to the inner diameter of sleeve segments 28 and 29. To do so means that in order to maintain the flat overlap surfaces for a length whereby the inner member extends beyond the point of tangency to the inner diameter results in a reduction in the effective cross-sectional area in the adjacent portion of the sleeve segment of the outer overlapping member in that vicinity, and consequently, may constitute a reduction in the effective strength of th installed joint. While any such reduction in strength may be in turn compensated for by increase in the radial thickness of the sleeve segments 28 and 29, such can result in an undesired penalty should weight be an important factor such as in aircraft applications.

It is to be understood that the total bond line area as used herein means the area defined by the circumference of the inner diameter of sleeve segments 28 and 29, plus the length of the steps 35 and/or 36 plus two times the width of surface confrontation 32 or 33 times the longitudinal or axial length of sleeve segments 28 and 29. Also, it is to be recognized that this total bond line area will be diminished by the inner circumference of sleeve segments 28 and 29 times the axial length of gap between confronting end surfaces of the pipe or tube members being joined.

Thusly, the effective strength of the installed joint will be dependent upon the total bond area plus the type of adhesive utilized and the effective thickness of adhesive.

FIGS. 7, 8 and 9 represent another embodiment of this invention capable of joining high pressure hydraulic lines or tubes 38 and 39 which consists of a pair of inner sleeve segments 40 and 41 adhesively bonded to tubes 38 and 39 with another pair of outer sleeve segments 42 and 43 in turn adhesively bonded over the inner segments 40 and 41. The dimensional relationships and configurations of sleeve segments 40 and 41 are the same as defined hereinabove relative to FIGS. 1 and 2 except that the outer diameter of segments 40 and 41 when installed may be substantially completely circular; this being preferred so as to permit sleeve segments 42 and 43 to be bonded thereover in a manner so as to obtain the optimized adhesive bond thickness between inner segments 40 and 41 and outer segments 42 and 43 of the installed joint.

As can best be seen in FIG. 9, the overlap joints between the outer segments 42 and 43 are shown rotated 90° from the overlap joints of inner sleeve segments 40 and 41. While this is believed to represent the greatest strength of the installed joint, the location of the overlap joint bond lines of the outer segments radially over the corresponding portions of the inner segments is not believed to materially reduce the effective joint strength as compared to the substantial increase in the total joint bond line area represented by the addiion of the outer sleeve segments.

FIGS. 10 through 13 define the embodiment of the invention involving tube members 44 and 45 of different confronting diameters being joined together, this arrangement applying whether the end of tube member 44 is expanded to form a bell mouth to receive the end of tube 45 or whether tube member 44 is of a larger diameter than tube 45 throughout its entire length. Likewise, it is to be understood with reference to FIG. 11 that the smaller tube 45 may be located within the larger diameter tube 44 as well as the end of tube 45 may be located coplanar with the end of tube 44 or spaced therefrom so as to provide a gap between the ends of tubes 44 and 45.

Sleeve segments 46 and 47 are provided with a step 48 intermediate the longitudinal ends thereof which represents or constitutes the change or break from the smaller inner diameter that fits over tube 45 to the larger inner diameter fitting over the end of tube 44.

Depending upon the relative differences of diameters between tubes 44 and 45, the segments 46 and 47 may be formed by boring a pair of sleeve members 46 and 47 extruded to the smaller inner diameter dimension if the relative differences between tubes 44 and 45 permit, or in the alternative should there be significant differences between the size of tubes 44 and 45, segments 46 and 47 may be made by appropriate casting or machining.

It is further to be understood that a segmented coupling of this invention could be utilized for joining two pipes or tubes that are axially angulated to each other, as well as three or more pipes or tubes may be joined as examplified by a T or cross joint. In these instances, the configuration of the coupling segments will depend on the joint configuration, but still utilize the overlapping, confronting surfaces and adhesive bonding principles of this invention.

In summary, it can be seen that practice of this invention permits an adhesive bonded joint of high strength, high integrity for joining hydraulic tubes or structural tubular members, and whether the joined members are of the same or substantially different size. It is also recognized that the joint of this invention can be achieved whether the joined members are coaxially aligned or at an angular relation therebetween, and whether the joined members are of the same or dissimilar materials.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A segmented sleeve structure for adhesive bonding to the circumference of a tubular member comprising:
a plurality of adjacent sleeve segment means having longitudinal confronting edge portions, each sleeve segment means configured to extend in partial longitudinal and circumferential directions for installation over a portion of the tubular member wherein such installation is solely an adhesive bonding interconnection between the inner surface of said segment means and the tubular member and between each pair of confronting longitudinal edge portions of said sleeve segment means when the segmented sleeve structure is installed,
each segment means having a substantially identical arcuate cross-sectional configuration with inner and outer diameter portions providing a combined circumferential arcuate extension,
said inner diameter portion having an effective diameter of no less than the outer diameter of the tubular member and a circumferential arcuate extension of no greater than 180° and less than said combined circumferential arcuate extension,
the longitudinal edge portions of each said segment means including at least one flat surface with the plane of at least one of said flat surfaces along each longitudinal edge portion angulated greater than 90° and less than 180° to the diametric plane of the tubular member including the arcuate extremity of the inner diameter circumferential portion nearest said angulated flat surface,
one of said longitudinal edge flat surfaces of each segment means formed on the outer side of the segment edge portion whose inner side comprises a part of the inner diameter portion surface, the other of said longitudinal edge flat surfaces of each segment means formed on the inner side of the segment edge portion that comprises the circumferential arcuate extension beyond said inner diameter portion in confrontation to the outer diameter of the tubular member, said longitudinal edge flat surfaces of each segment means in confrontation to the opposite longitudinal edge flat surfaces of adjacent corresponding segment means comprising a 360° sleeve structure, and at least one interference means in the seam between each pair of adjacent segment means to restrict radially inward inner diameter reducing movement of each pair of adjacent segment means.

2. A joint for joining tubular members comprising the segmented sleeve structure of Claim 1 bonded to the circumferential end portions of at least two contiguous tubular members by a curable adhesive, said adhesive located between the outer circumferential portions of the tubular members and the inner diameter portions of each sleeve segment means having direct confrontation therebetween as well as between the confronting flat surfaces of each pair of adjacent sleeve segment means.

3. A joint as defined in claim 2 wherein the adhesive is of a thermo-setting material.

4. A joint as defined in claim 2 wherein the adhesive is of an ambient-setting material.

5. A segmented sleeve structure as defined in claim 1 wherein the thickness of each sleeve segment means between said inner and outer diamter portions is constant longitudinally throughout any longitudinal plane therein.

6. A segmented sleeve structure as defined in claim 1 wherein the outer diameter portion of each sleeve segment means comprises an intermediate portion between opposite end portions; the thickness of each sleeve segment means through said intermediate portion is constant longitudinally throughout any longitudinal plane therein, and the longitudinal thickness through said opposite end portions varies by the outer diameter surface of the opposite end portions tapering from the intermediate portion radially inward toward the inner diameter portion.

7. A segmented sleeve structure as defined in claim 1 wherein the effective diameter of said inner diameter portion of each sleeve segment means is approximately 0.001 to 0.015 inch greater than the tubular member outer diameter.

8. A joint for joining tubular members as defined in claim 2 and including a second said segmented sleeve structure of larger effective diameters adhesively bonded over at least a longitudinal portion of the first segmented sleeve structure.

9. A segmented sleeve structure as defined in claim 1 wherein each said sleeve segment means is longitudinally adapted and configured to have at least a first and second effective inner diameter portions whereby said structure may be adhesive bonded to the contiguous ends of tubular members having at least two different outer diameters.

* * * * *